Jan. 27, 1931. C. P. BETTENGA 1,789,996
SEPARATING ATTACHMENT FOR HULLING MACHINES
Filed July 30, 1927
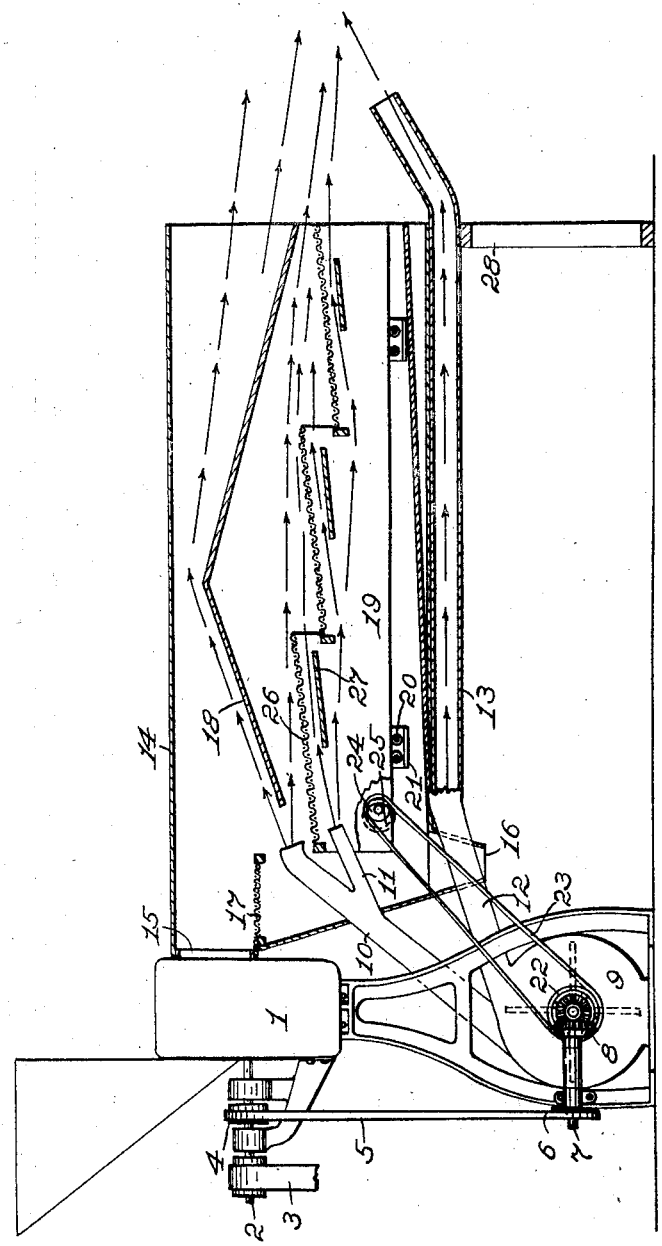
Inventor
Creno P. Bettenga
By G. C. Kennedy
Attorney Patented Jan. 27, 1931

1,789,996

UNITED STATES PATENT OFFICE

CRENO P. BETTENGA, OF MARSHALLTOWN, IOWA

SEPARATING ATTACHMENT FOR HULLING MACHINES

Application filed July 30, 1927. Serial No. 209,562.

My invention relates to improvements in separating attachments for hulling machines, and the object of my improvement is to provide a device adapted to receive a mixture of hulled grain and the removed hulls thereof, and separate the hulls and fragments thereof perfectly and cleanly from such hulled grain, in a minimum time and by means of an inexpensive construction.

This object I have accomplished by the means which are hereinafter described and claimed, and which are illustrated in the accompanying drawing, in which the figure is a medial longitudinal section of my improved separating attachment as operatively connected to and in communication with a conventional representation of a hulling machine, parts being broken away or shown in elevation.

My separating attachment is such that it may be placed in communication with the delivery port of any kind of hulling machine, but as shown, is more particularly appropriated for use in connection with an oat huller, being peculiarly suitable to receive from such a machine and treat a mingled mass of hulled oats and the scrappy hulls and fragments of hulls therefrom, to separate and independently deliver to different places of deposit these materials, while assuring the complete removal from the hulled grain of the merest particles of the removed hulls, thus efficiently fitting the device for use in preparing the oats for use as a food product, or a feed for animals or fowls. The hulls from oats are particularly obnoxious when mixed in feed, because of their pervasive lightness and because also of their flinty or sharp character. My improvement in the separating function of the machine is therefore important for producing purified grain.

It is also to be understood that modifications of my specific improvements are nevertheless covered by the appended claims.

I have shown at 1 a conventional oat hulling machine which houses rotary hulling devices not shown, rotated by a driving shaft 2 and driving belt 3.

My separating attachment or apparatus is mostly included within an elongated hollow horizontal housing 14 supported at one end and in communication with a short delivery spout 15 of the hulling machine 1, the latter containing a rotary huller not shown which acts also as a fan to drive a mixture of cleaned grain and removed hulls through the spout 15 under pressure of air current, the housing having a delivery spout 16 for cleaned grain at the bottom of its rear end, the machine 1 being to the rear of said housing. The forward end of the housing 14 is open. A horizontally bracketed reticulated sieve member 17 initially receives thereon and thereacross the moving mingled mass of cleaned grain and the removed hulls thereof delivered from the spout 15. Any smaller cleaned grain or fragments which fall through the meshes of this fixed sieve drop through the lower spout 16 to be received in any receptacle placed thereunder. The other mingled grain and hulls are continually blown forward and delivered by the air current from the huller over the forward edge of said sieve. Directly in advance of the sieve 17 and spaced apart therefrom is an imperforate division plate 18 crossing the housing 14 from side to side and shaped with anticlinal parts, of which the rearmost part slopes upward to join the forward part at a wide angle, the forward part being gently inclined toward the open forward end of the housing. Cleaned grain can slide rearwardly downward the rear slope of the plate 18, and separated hulls can pass forwardly and downwardly over the forward slope of the plate.

Beneath the anticlinally shaped division plate 18 is positioned a boxing having opposite sides 19, an open bottom, and a top arranged as a transverse stepped sieve, of which the steps 26 are slightly overlapped in succession due to their being separately inclined downwardly rearwardly but all arranged in a row slightly inclined forwardly. Underneath each sieve step 26 is positioned a spaced and similarly rearwardly inclined imperforate plate 27 which is narrower than the sieve step above and which has its forward end spaced a little to the rear of the forward edge of the sieve step. By this relative arrangement of the sieve steps 26 and the imperforate plates 27 the overlapped end parts of the sieve steps have an interspace as shown immediately in front of each plate 27, the interspace of the plate and sieve above leading thereinto.

The boxing 19 is preferably supported at its sides on rollers 20 mounted on housing wall brackets 21. The boxing 19 is to be reciprocated longitudinally by the following means.

A fan-wheel housing 9 is positioned to the rear of and below the housing 14, its fan-wheel being rotated at a proper speed of rotation by bevel-gearing at 8, the fan-wheel shaft also carrying a small belt-wheel 22, and the latter running about another belt-wheel 24 rotatably mounted upon said boxing, and having on the same shaft an eccentric and strap device for reciprocating the boxing in a well-known way. The bevel gearing 8 has for the pinion thereof a shaft 7 driven by a belt 5 on its belt-wheel 6, the upper end of the belt being driven by a belt-wheel 4 on said driving-shaft 2.

The fan-wheel casing 9 has two air-spouts 10 and 12, the former entering the lower rear part of the housing 14, and within the latter divided into upper and lower parts of which the upper part delivers air under light pressure both over and under the inclined rear part of the anticlinal plate 18, and over the stepped sieves 26, while the lower spout 11 delivers a light current of air as indicated by the arrows between the stepped sieves 26 and the plates 27, as also beneath said plates. The lowermost spout 12 is continued forwardly tubularly at 13 to have its forward end project beyond the open forward end of the housing 14, and inclined slightly upwardly. The spout 12 and its continuation 13 are beneath said housing, the forward end of the housing being supported on legs 28. The air current from said fan-wheel spouts is only powerful enough to propel the light separated hulls forwardly, but cannot prevent the heavier grain from moving downwardly or against said current.

As a mixed quantity of hulled grain and the fragments of removed hulls therefrom is delivered forwardly from the sieve element 17, it is penetrated and additionally driven by the air current from the upper spout 10, whereby most of the light hulls are driven up over and then downwardly along the anticlinal plate 18 to be expelled at the forward open end of the housing. In order to reinforce the action of said air current from the spout 10, the air current issuing from the lower tubular spout 13 drives forwardly and upwardly to catch and propel the issuing hulls to carry them a farther distance and sufficienty away from the apparatus.

It will be understood that the heavier hulled oats will drop between the sieve 17 and the plate 18, or if carried upon the plate 18 will slide thence rearwardly to drop and be delivered through the spout 16, but all such as the lighter ones which fall upon the rearmost step of the sieve device 26 will be agitated thereon, so that they will fall through it and when carried upon the successive sieve steps 26 in the same way for all the hulled grain carried forward and thereupon. Any hulled grain which falls upon the inclined plates 27 escapes therefrom rearwardly to be delivered by way of the spout 16, the bottom of the housing 14 preferably having a slight incline rearwardly.

The important and new feature of my invention is the provision of these inclined plates 27. They function to prevent too much of the air current from below traversing the sieve steps 26 upwardly, so that the screening action of the latter is not interfered with or so slightly as to not prevent nor hinder their separation of the hulled grain and the small scales or fragments of hulls which are within the interspaces of the sieve steps and the plate 18. Some of these smaller particles will enter the interspaces of the plates 27 and the sieve steps 26 above, but the air current from the spout 11 will propel these fragments of hulls forwardly over the plates 27 through the interspaces of the sieve steps, over the latter to be finally expelled at the forward open end of the housing 14. In this way it has been practically demonstrated that a perfect separation is accomplished between the hulled grain and the hulls, and it has also been demonstrated that my device will act upon the imperfectly cleaned mixtures delivered by the separating attachments of other machines or separators, and take therefrom a considerable quantity of hull fragments not properly eliminated in the process of separation.

My machine, by the provision of an alined but stepped congeries of sieve steps in combination with a single row of the plate devices 27 thereunder therefore accomplishes perfectly the purpose of the invention, and by the simplest and most inexpensive means, serving economy in production and lower cost of apparatus for the purchaser.

Having described my invention, what I claim as new, and desire to secure by Letters Patent, is:

1. In a separator, means for supplying the material to be separated under pressure, oppositely inclined plates adjacent said means for preliminary separation of the material, a reciprocatory sieve positioned below the plates and composed of sieve sections arranged in inclined steps spaced vertically at their overlapped terminations, and pneumatic means having separate nozzles for carrying material over both the inclined plates and over said sieve.

2. In a separator, means for supplying the material to be separated having a delivery port and including a fixed sieve member below said port, a reciprocatory multiple stepped inclined screen, and like inclined and narrower baffle plates below the stepped parts of the screen and reciprocatory therewith.

3. In a separator, means for supplying the material to be separated under pressure, imperforate oppositely inclined plates adjacent said means for preliminary separation of the material, a reciprocatory sieve positioned below the plates and composed of sections arranged in inclined steps spaced vertically at their overlapped terminations, baffle plates below said sections and reciprocatory therewith, and pneumatic means having separate nozzles for carrying material over said inclined plates, said sieve and said baffle plates.

In testimony whereof I affix my signature.

CRENO P. BETTENGA.